United States Patent
Averette, Jr.

(10) Patent No.: US 6,820,363 B1
(45) Date of Patent: Nov. 23, 2004

(54) ANIMAL ATTRACTANT DISPENSER SYSTEM

(76) Inventor: Julius P. Averette, Jr., 10740 Gurney Rd., Baker, LA (US) 70714-8614

( * ) Notice: Subject to any disclaimer, the term of this patent is extended or adjusted under 35 U.S.C. 154(b) by 0 days.

(21) Appl. No.: 10/136,558

(22) Filed: May 1, 2002

(51) Int. Cl.[7] ............................................. A01M 31/00
(52) U.S. Cl. .................................. 43/1; 239/44; 239/45
(58) Field of Search ........................... 43/1; 239/44, 45, 239/34, 55, 57, 59, 37, 145, 43; D22/119, 125, 120; D23/368; 431/312

(56) References Cited

U.S. PATENT DOCUMENTS

| | | | | | |
|---|---|---|---|---|---|
| 4,269,591 | A | * | 5/1981 | Knoll | 431/312 |
| 4,937,431 | A | * | 6/1990 | Jameson et al. | 392/395 |
| 5,744,106 | A | * | 4/1998 | Eagle | 422/306 |
| 5,746,019 | A | * | 5/1998 | Fisher | 43/1 |
| D401,660 | S | * | 11/1998 | Timm et al. | D22/125 |
| 5,832,648 | A | * | 11/1998 | Malone | 43/1 |
| 5,857,281 | A | * | 1/1999 | Bergquist et al. | 43/1 |
| 6,158,668 | A | * | 12/2000 | Burgeson | 239/47 |
| 6,241,161 | B1 | * | 6/2001 | Corbett | 239/58 |
| D447,533 | S | * | 9/2001 | Cox | D22/125 |
| 6,340,120 | B1 | * | 1/2002 | Seymour | 239/59 |
| 6,470,619 | B1 | * | 10/2002 | Snyder et al. | 43/1 |

* cited by examiner

Primary Examiner—Peter M. Poon
Assistant Examiner—Bethany L. Griles
(74) Attorney, Agent, or Firm—Warner J. Delaune (57) ABSTRACT

Aa liquid animal attractant dispensing system for dispensing liquid animal attractants into the air that included a mechanism for providing a steady replenishment of attractant to the dispersing element, such as a wick, and which further included an assembly which allowed the dispersing element to be retracted into a storage container even while saturated with liquid attractant in a manner such that the liquid attract is recovered for later use.

8 Claims, 9 Drawing Sheets

ANIMAL ATTRACTANT DISPENSER SYSTEM

TECHNICAL FIELD

The present invention relates to systems and assemblies for dispersing liquid animal attractants in a controlled and sustained manner and more particularly to an animal attractant dispenser system that includes a liquid animal attractant container, an elongated wick member, a wick retraction and extension assembly in connection with the liquid animal attractant container provided with a wick passage slot therethrough and having a retraction and extension mechanism incorporated therein in operable connection with the elongated wick member such that the elongated wick member may be retracted through the wick passage slot into the liquid animal attractant container by rotational operation of the retraction and extension mechanism in a first direction and the elongated wick member may be extended from the liquid animal attractant container through the wick passage slot by either rotational operation of the retraction and extension mechanism in a second direction opposite the first direction or by positioning the retraction and extension mechanism in a specific position such that the elongated wick member is disengaged from the wick member and the wick member is free to slide out of the liquid animal attractant container through the wick passage slot; and a combined sealing cap support structure including a sealing cap adapted to sealing engage a threaded top structure of a wick extension opening of the wick retraction and extension assembly and a sealing, rotatably connected support structure connected to the sealing cap and fixedly attached to a top end of the elongated flexible wick member extension assembly in a manner to allow the sealing cap to be rotationally tightened onto the threaded top structure of the wick extension opening of the wick retraction and extension assembly without causing the wick member to become twisted.

BACKGROUND ART

Many hunters and individuals in viewing wildlife in their natural surroundings find the use of attractants increases their chances of seeing such wildlife. Liquid attractants are both effective and popular, however, using the liquid attractants can be bothersome because of the need to refill the attractant dispenser frequently or the attractant is wasted because the attractant is not recoverable for use at a later time or another location. It would be desirable, therefore, to have a liquid animal attractant dispensing system for dispensing liquid animal attractants into the air that included a mechanism for providing a steady replenishment of attractant to the dispersing element, such as a wick, and which further included an assembly which allowed the dispersing element to be retracted into a storage container even while saturated with liquid attractant in a manner such that the liquid attract is recovered for later use.

GENERAL SUMMARY DISCUSSION OF INVENTION

It is thus an object of the invention to provide an animal attractant dispenser system that includes a liquid animal attractant container, an elongated wick member, a wick retraction and extension assembly in connection with the liquid animal attractant container provided with a wick passage slot therethrough and having a retraction and extension mechanism incorporated therein in operable connection with the elongated wick member such that the elongated wick member may be retracted through the wick passage slot into the liquid animal attractant container by rotational operation of the retraction and extension mechanism in a first direction and the elongated wick member may be extended from the liquid animal attractant container through the wick passage slot by either rotational operation of the retraction and extension mechanism in a second direction opposite the first direction or by positioning the retraction and extension mechanism in a specific position such that the elongated wick member is disengaged from the wick member and the wick member is free to slide out of the liquid animal attractant container through the wick passage slot; and a combined sealing cap support structure including a sealing cap adapted to sealing engage a threaded top structure of a wick extension opening of the wick retraction and extension assembly and a sealing, rotatably connected support structure connected to the sealing cap and fixedly attached to a top end of the elongated flexible wick member extension assembly in a manner to allow the sealing cap to be rotationally tightened onto the threaded top structure of the wick extension opening of the wick retraction and extension assembly without causing the wick member to become twisted.

Accordingly, an animal attractant dispenser system is provided. The an animal attractant dispenser system includes a liquid animal attractant container, an elongated wick member, a wick retraction and extension assembly in connection with the liquid animal attractant container provided with a wick passage slot therethrough and having a retraction and extension mechanism incorporated therein in operable connection with the elongated wick member such that the elongated wick member may be retracted through the wick passage slot into the liquid animal attractant container by rotational operation of the retraction and extension mechanism in a first direction and the elongated wick member may be extended from the liquid animal attractant container through the wick passage slot by either rotational operation of the retraction and extension mechanism in a second direction opposite the first direction or by positioning the retraction and extension mechanism in a specific position such that the elongated wick member is disengaged from the wick member and the wick member is free to slide out of the liquid animal attractant container through the wick passage slot; and a combined sealing cap support structure including a sealing cap adapted to sealing engage a threaded top structure of a wick extension opening of the wick retraction and extension assembly and a sealing, rotatably connected support structure connected to the sealing cap and fixedly attached to a top end of the elongated flexible wick member extension assembly in a manner to allow the sealing cap to be rotationally tightened onto the threaded top structure of the wick extension opening of the wick retraction and extension assembly without causing the wick member to become twisted.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

FIGS. 1–10 show various aspects of an exemplary embodiment of the animal attractant dispenser system of the present invention generally designated 10. Animal attractant dispenser system 10 includes a liquid animal attractant container, generally designated 12, having an attractant cavity 13 filled with a quantity of animal attractant 14 (in this example deer urine); an elongated, flat, tubular, cotton wick member, generally designated 16; a wick retraction and extension assembly, generally designated 20, in threaded connection with the liquid animal attractant container 12, provided with a wick passage slot 24 therethrough and having a retraction and extension mechanism, generally designated 28, incorporated therein in operable connection with the wick member 16 such that the wick member 16 may be retracted through the wick passage slot 24 into the attractant cavity 13 of liquid animal attractant container 12 by rotational operation of the retraction and extension mechanism 28 in a first direction and the elongated wick member 16 may be extended from the attractant cavity 13 of liquid animal attractant container 12 through wick passage slot 24 by either rotational operation of the retraction and extension mechanism 28 in a second direction opposite the first direction or by positioning the retraction and extension mechanism 28 in a specific position such that a wick non-engaging area 38 of a wick member engaging, toothed member 40 having a number of wick member engaging teeth 49 of the retraction and extension mechanism 28 is positioned in a location such that all of the wick member engaging teeth 49 of the retraction and extension mechanism 28 are disengaged from the elongated wick member 16 and the elongated wick member 16 is free to slide out of the attractant cavity 13 of the liquid animal attractant container 12 through wick passage slot 24; and a combined sealing cap support structure, generally designated 50. The wick member engaging, toothed member 40 of the retraction and extension mechanism 28 is rotatable by the user using a toothed member positioning knob, generally designated 57 having an indicator provided thereon in the form of an arrow 59 that when pointed upward in the direction of the direction of extension of the wick member 16, indicates to the user that all of the wick member engaging teeth 49 of the retraction and extension mechanism 28 are disengaged from the elongated wick member 16 and the elongated wick member 16 is free to slide out of the attractant cavity 13.

Combined sealing cap support structure 50 includes a sealing cap, generally designated 52, having internal cap threads 54 companionately sized to sealing engage an externally threaded top structure 58 of the wick retraction and extension assembly 20 that defines a wick extension opening 60 thereof and a sealingly, rotatably connected support structure, generally designated 64, connected to and passing through a top surface 66 of sealing cap 52, held in place by a C-clip 73 inserted into circumferential clip slot 75 and having a bottom portion surrounded by the internal cap threads 54 of sealing cap 52 that is fixedly attached to a top end 70 of the elongated flexible wick member 16. Support structure 64 is made to be sealingly rotatable to sealing cap 52 to allow the sealing cap 52 to be rotationally tightened onto the threaded top structure 58 of wick retraction and extension assembly 20 without causing the top end 70 of the wick member 16 to become twisted.

Figure 1:
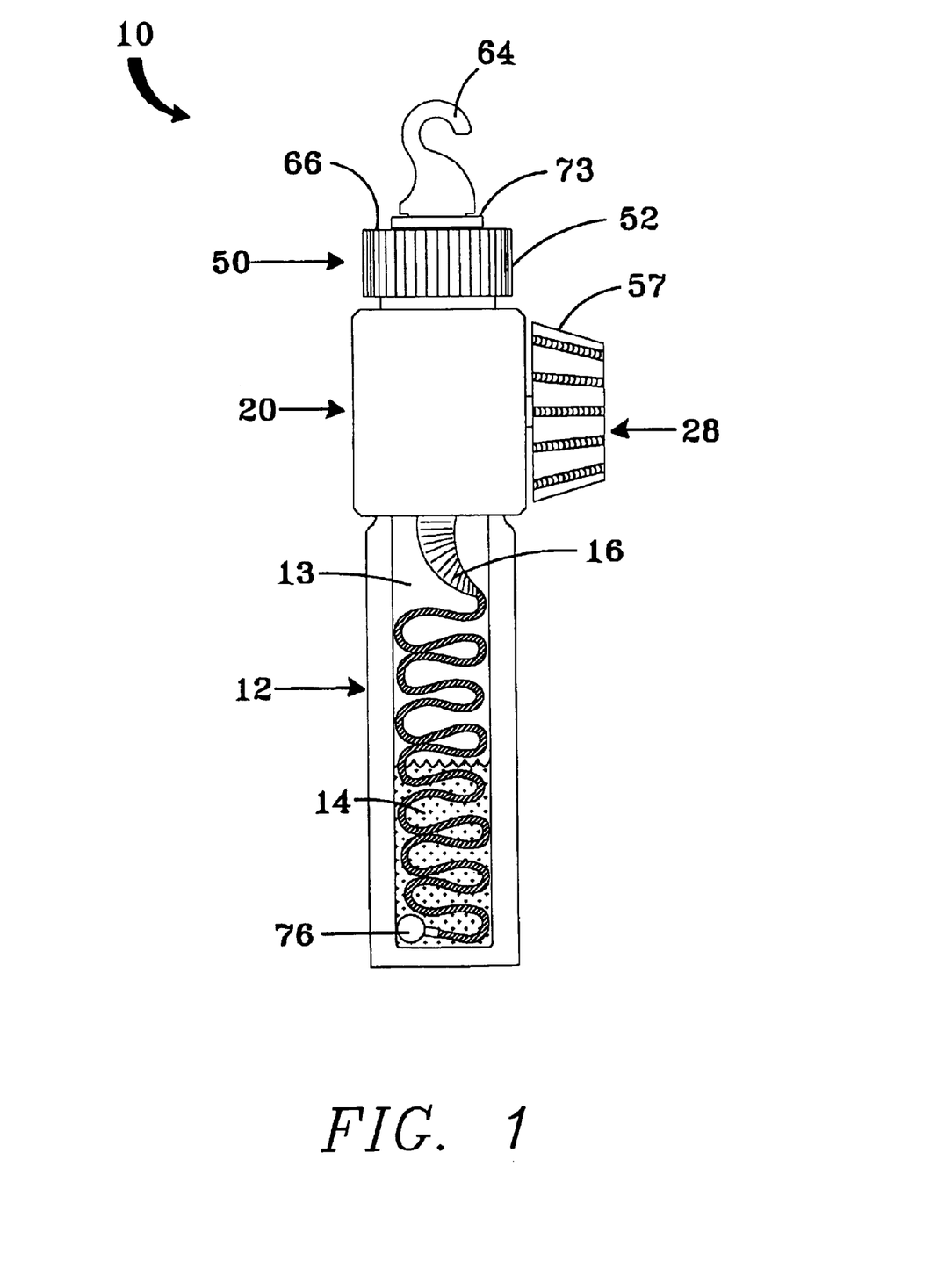
FIG. 1 is a side plan view of an exemplary embodiment of the animal attractant dispenser system of the present invention.
Figure 2:
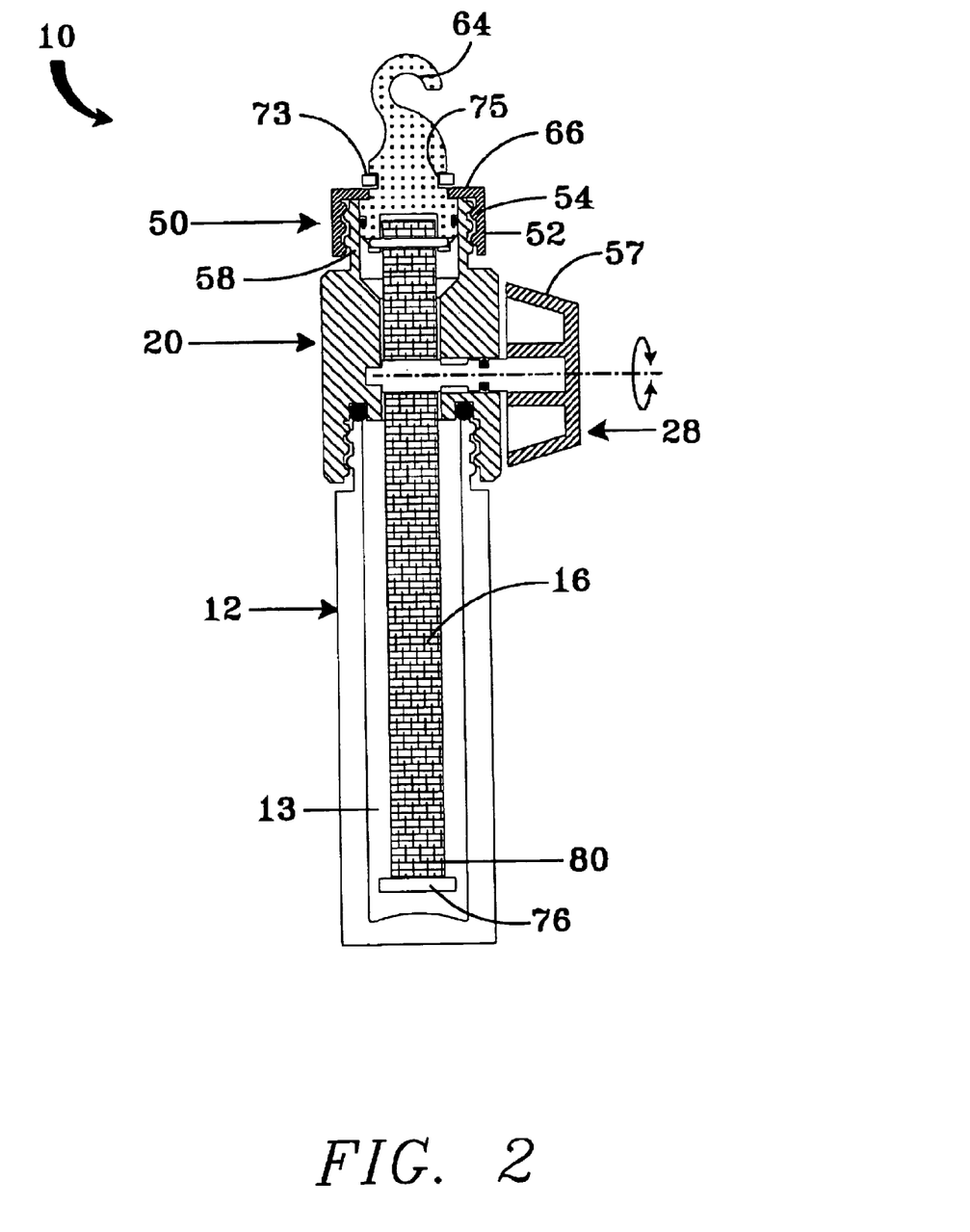
FIG. 2 is a cross section view of the animal attractant dispenser system of FIG. 1.
Figure 3:
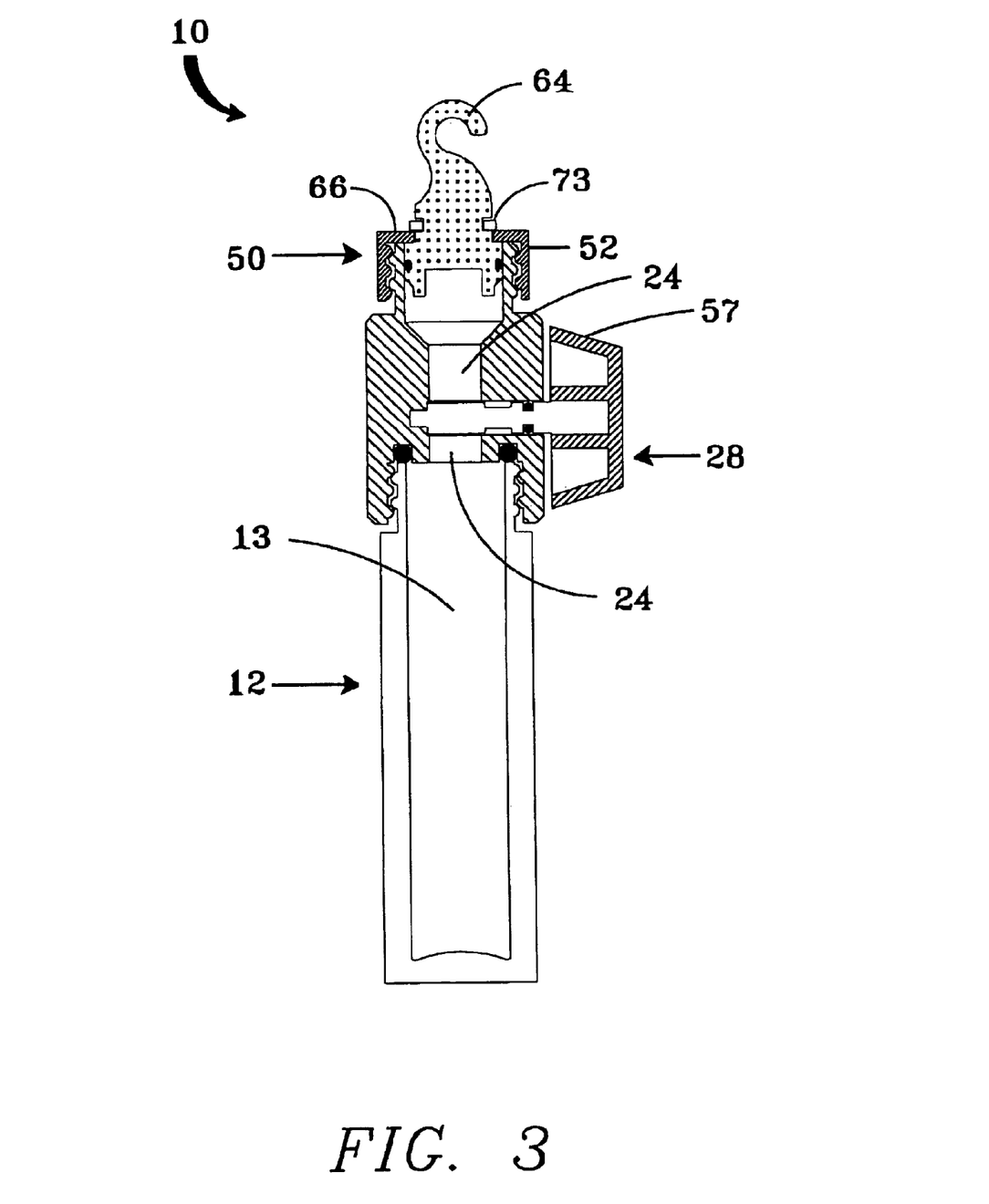
FIG. 3 is a second cross section view of the animal attractant dispenser system of FIG. 1 with the wick member removed.
Figure 4:
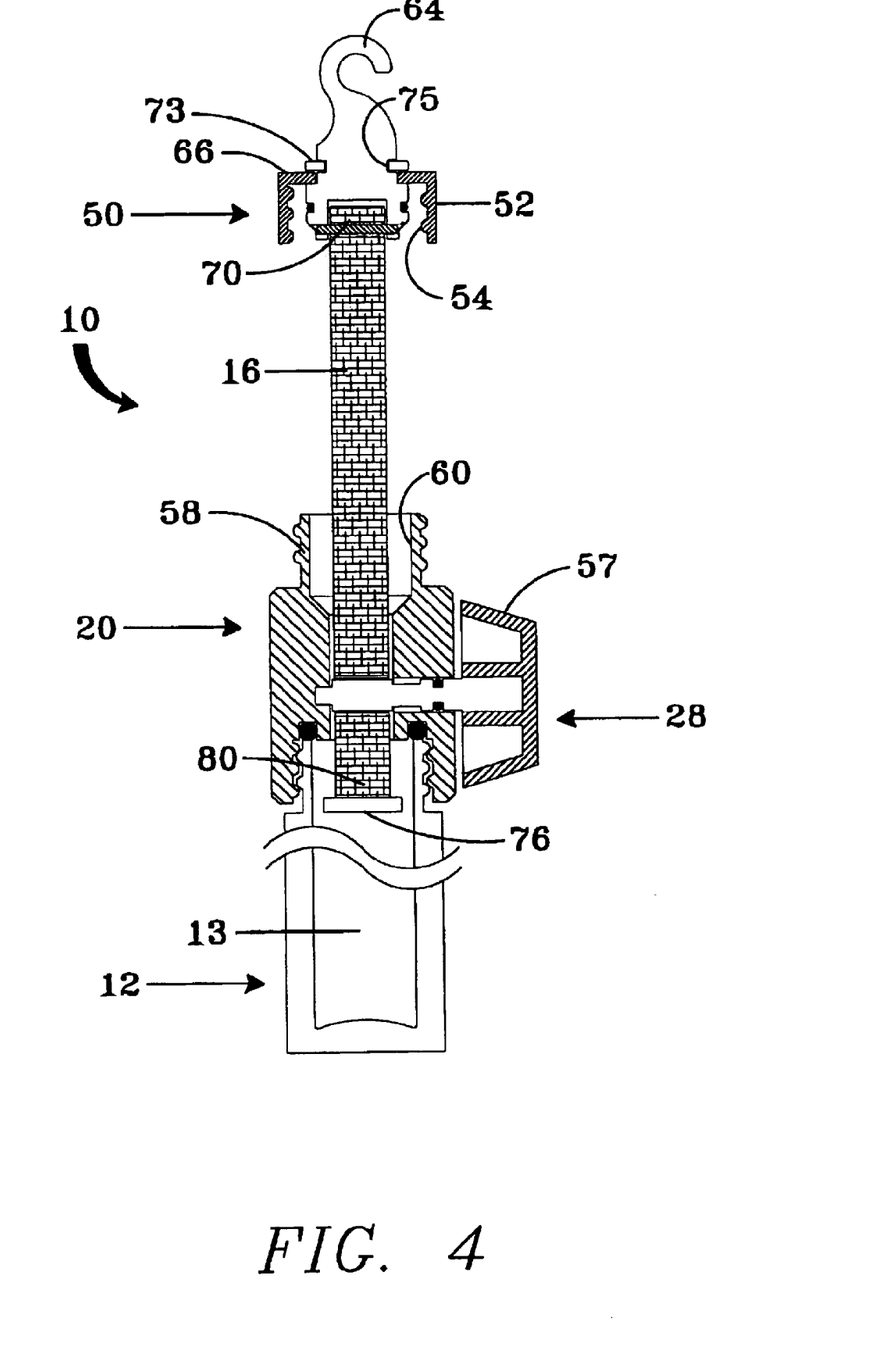
FIG. 4 is a third cross section view of the animal attractant dispenser system with the wick member extended.
Figure 5:
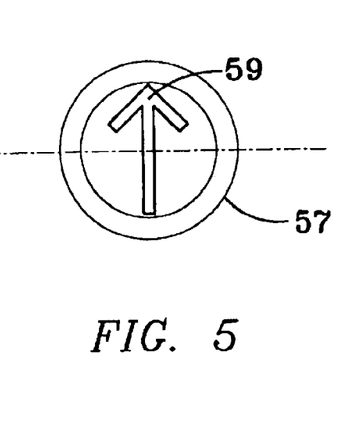
FIG. 5 is a knob front plan view of the wick retraction and extension knob of the wick retraction and extension assembly of the animal attractant dispenser system in isolation.
Figures 6, 7, 8:
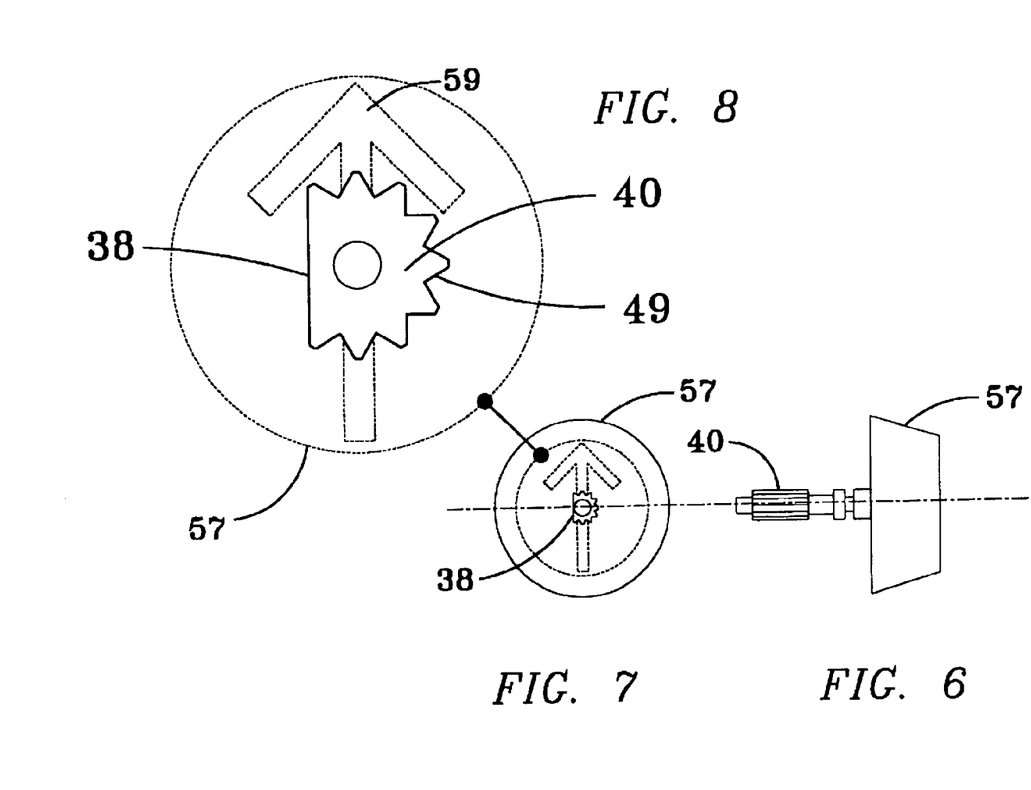
FIG. 6 is a side plan view of the wick retraction and extension knob and the wick rewind gear on the knob rotation shaft of the wick retraction and extension assembly of the animal attractant dispenser system in isolation animal attractant dispenser system.
FIG. 7 is a shaft end view of side plan view of the wick retraction and extension knob and the wick rewind gear on the knob
FIG. 8 is a detail shaft end plan view of the wick rewind gear on the knob rotation shaft showing the wick member engaging gear teeth positioned around a semi-circular portion of the rewind gear and a flat, recessed area that forms a wick for allowing the wick member to slide rapidly out of the attractant container when the arrow point on the front of the wick retraction and extension knob is pointed upward toward the dispenser support structure.
Figure 9:
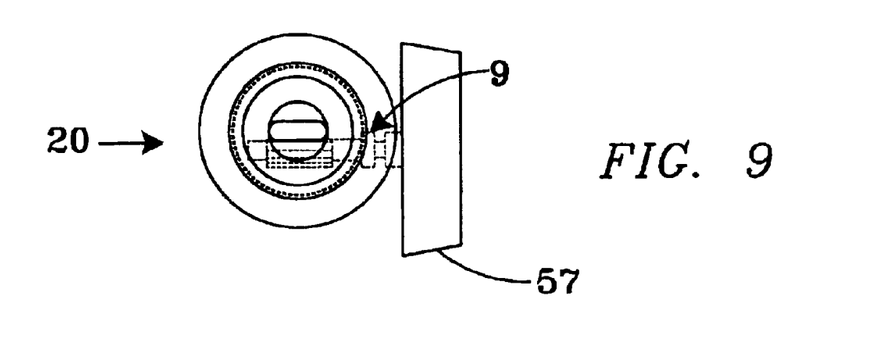
FIG. 9 is top plan view of the wick retraction and extension assembly showing the wick passage slot opening adjacent the wick rewind gear with the flat, recessed area forming the wick slide gap adjacent the wick passage slot such that the wick member is allowed to slide rapidly out of the attractant container.
Figure 10:
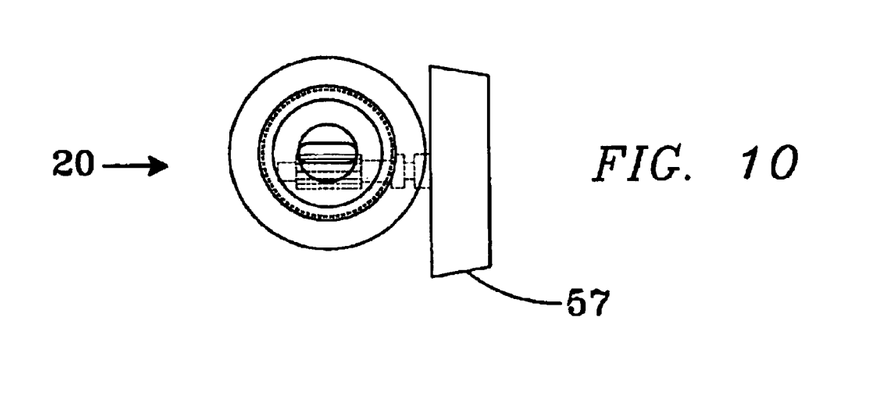
FIG. 10 is top plan view of the wick retraction and extension assembly showing the wick passage slot opening adjacent the wick rewind gear with the wick engaging gear teeth positioned adjacent the wick passage slot such that the wick member may be rewound back into the attractant container through the wick passage slot opening by rotation of the wick retraction and extension knob.

The bottom end 80 of wick member 16 is provided with a stop member 76 sized to prevent bottom end 80 from passing out of attractant cavity 13 through wick passage slot 24.

Figure 11:
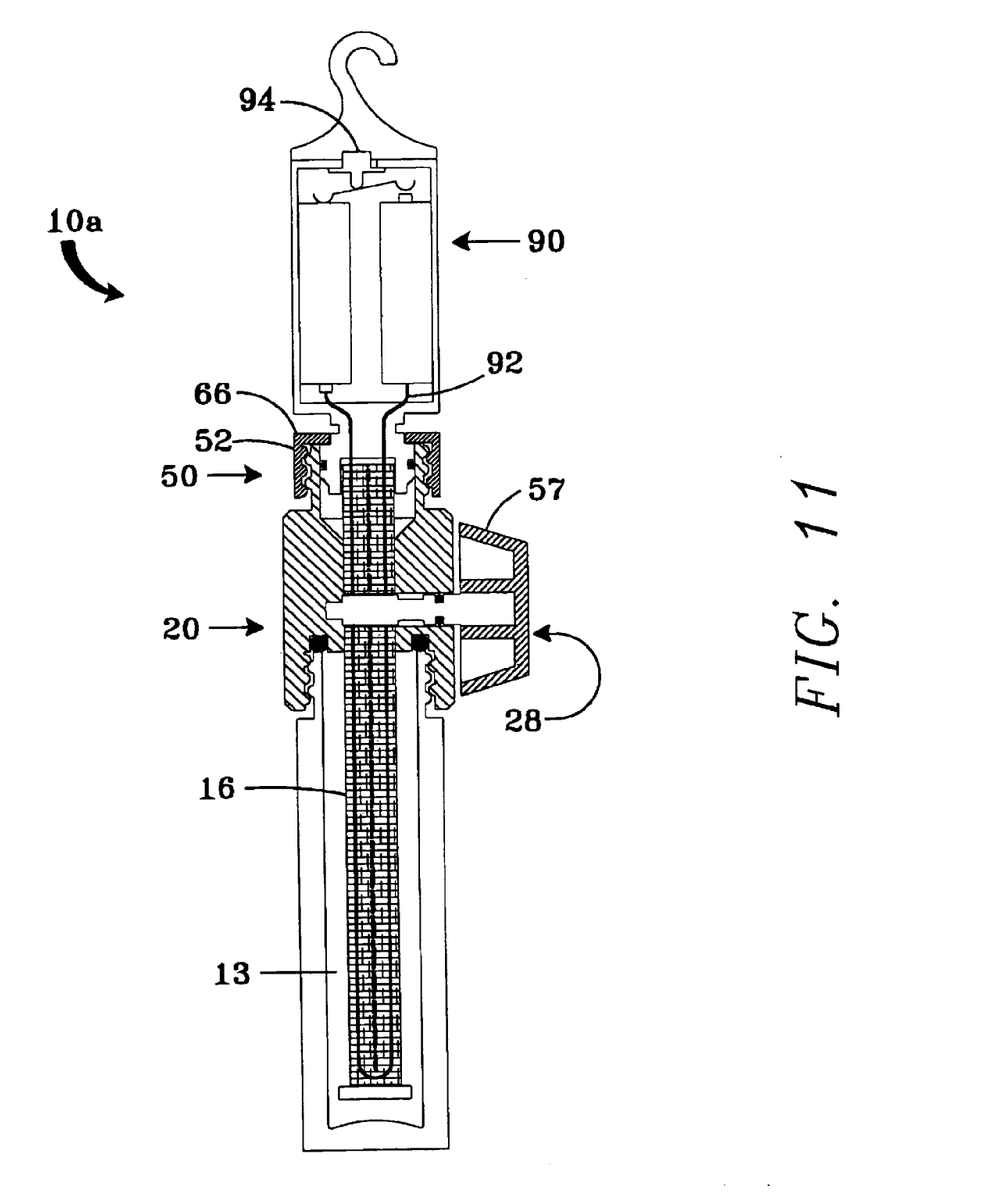
FIG. 11 is cross sectional view showing a second exemplary of the animal attractant dispenser system of the present invention that includes a battery powered wick heating mechanism.

FIG. 11 shows a second exemplary embodiment of the animal attractant dispenser system, generally designated 10a, that further includes a battery powered wick member heating mechanism, generally designated 90 that includes a battery powered, electrical resistance heating element 92 in connection with an on/off switch 94 and positioned within wick member 16. In this embodiment, battery powered, electrical resistance heating element 92 has electronic control circuitry adapted to maintain the liquid animal attractant within a temperature range of between 35° and 100° Fahrenheit.

Figure 12:
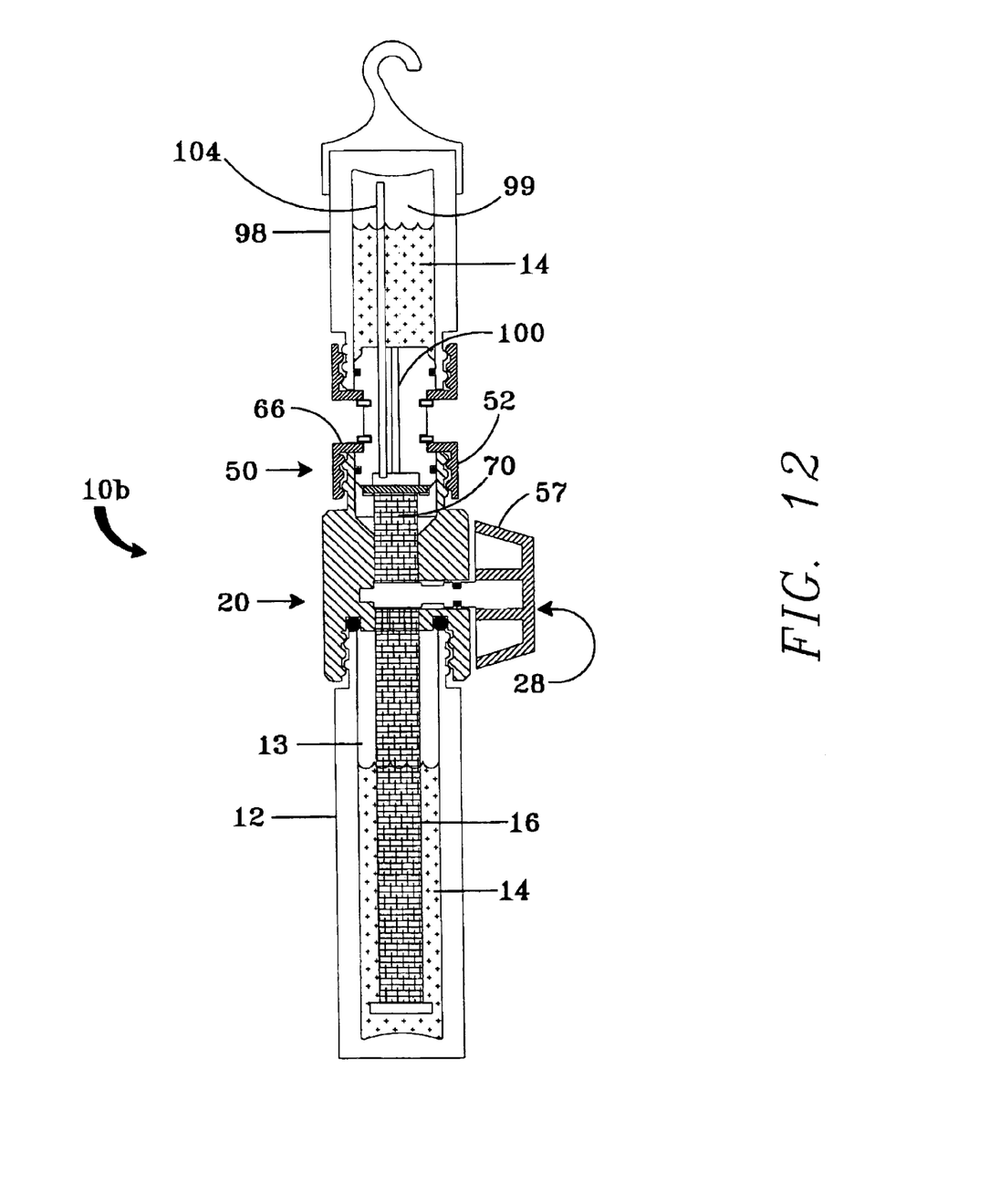
FIG. 12 is a cross sectional view showing a third exemplary embodiment of the animal attractant dispenser system of the present invention that includes a second liquid animal attractant container having a bottom wetting orifice tube for allowing liquid animal attractant to drip onto the top end of the wick member and a vent tube for allowing the filling of the second liquid attractant reservoir.
Figure 13:
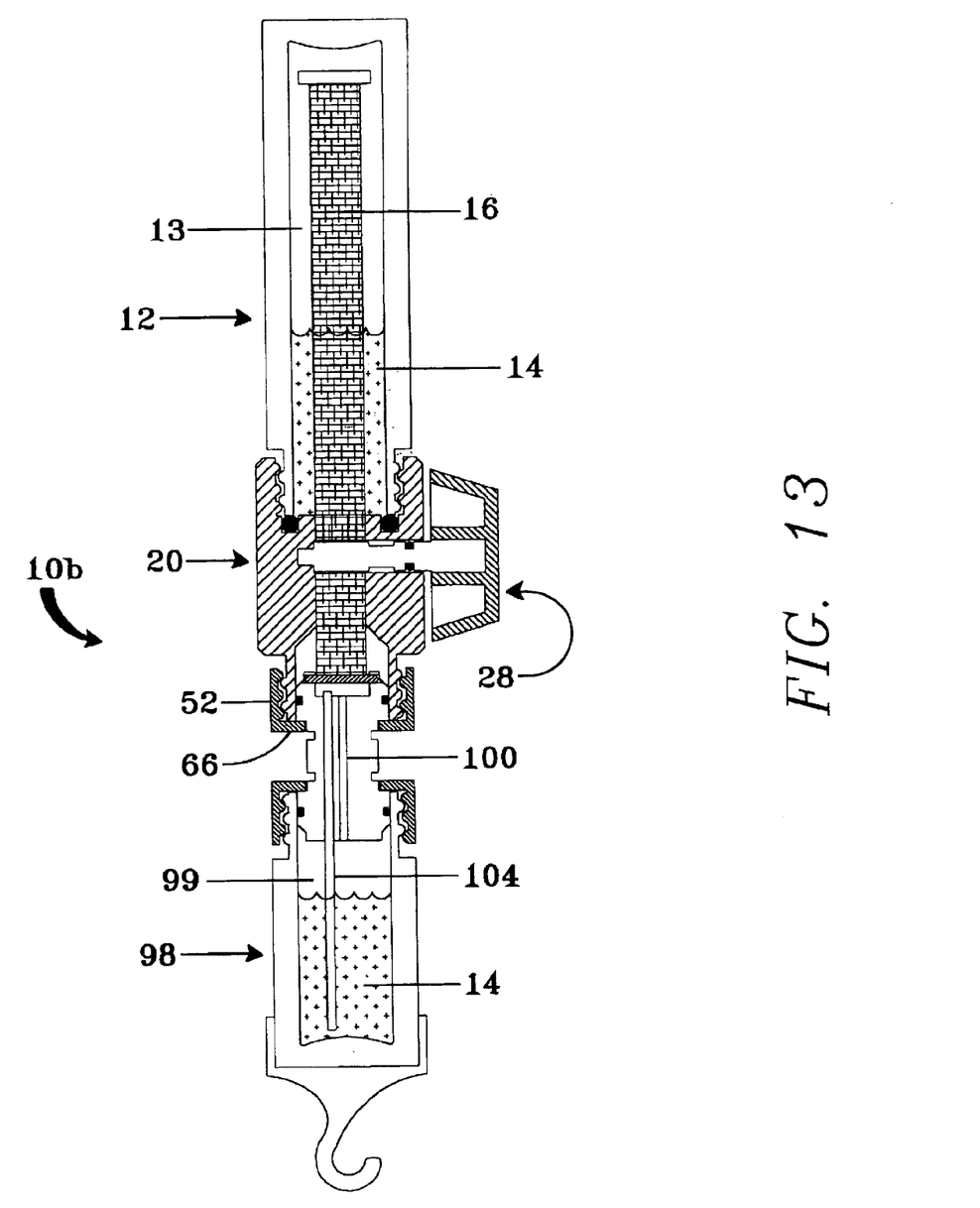
FIG. 13 is a second cross sectional view showing the third exemplary embodiment of the animal attractant dispenser system of FIG. 12.

FIGS. 12 and 13 show a third exemplary embodiment of the animal attractant dispenser system of the present invention, generally designated 10b. Animal attractant dispenser system 10b includes a second liquid animal attractant container, generally designated 98, having a second attractant cavity 99 in connection with a bottom, wick member wetting orifice tube 100 for allowing liquid animal attractant 14 from second attractant cavity 99 to drip onto the top end 70 of wick member 16 and a vent tube 104 for allowing the filling of the second attractant cavity 99.

It can be seen from the preceding description that an animal attractant dispenser system has been provided.

It is noted that the embodiment of the animal attractant dispenser system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An animal attractant dispenser, comprising:
   (a) a first container having an upper aperture;
   (b) a wick retraction and extension assembly having a lower opening and an upper opening, wherein said lower opening is sealably connected to said upper aperture, and further including a wick passage slot extending between said upper opening and said lower opening; said wick retraction and extension assembly including a rotatable shaft having a gear, said gear including a wick engaging portion and a wick non-engaging portion, wherein said gear is disposed partially within said wick passage slot, and wherein orientation of said shaft in a first predetermined position causes said wick engaging portion to engage said wick member, and wherein orientation of said shaft in a second predetermined position causes said wick non-engaging porotion to permit said wick member to slide within said wick passage slot;
   (c) a sealing cap assembly sealably connected to said upper opening; and
   (d) an elongated wick member having a portion thereof residing within said wick passage slot, said wick member further including:
      (i) a first end residing within said first container, said first end having a stop member sized to prevent passage of said first end through said wick passage slot; and
      (ii) a second end operatively connected to said sealing cap assembly.

2. The dispenser of claim 1, wherein said shaft is positionable into said first and second predetermined positions by a knob connected to said shaft.

3. The dispenser of claim 1, wherein said wick retraction and extension assembly includes a visible indicator Corresponding to the position of said shaft.

4. The dispenser of claim 1, wherein said wick engaging portion comprises gear-type teeth.

5. The dispenser of claim 1, wherein said sealing cap assembly includes a cap support structure having a sealing surface sealingly engageable with said upper opening, and a cap member rotatably connected to said cap support structure and matingly engageable with said upper opening.

6. The dispenser of claim 1, wherein said wick member comprises a fabric material having a flat cross-section.

7. The dispenser of claim 1, further comprising a battery powered wick member heating mechanism.

8. The dispenser of claim 1, further comprising a second container having a bottom wetting orifice tube means for allowing liquid animal attractant to drip onto said second end of said wick member and vent tube means for allowing said second container to be filled by allowing air, displaced by entering liquid animal attractant; to flow past said entering liquid attractant and into said first container.

* * * * *